(12) United States Patent
Scheper et al.

(10) Patent No.: US 9,352,781 B2
(45) Date of Patent: May 31, 2016

(54) MOTOR VEHICLE WITH A VEHICLE FRAME

(71) Applicant: ZF Friedrichshafen AG, Friedrichshafen (DE)

(72) Inventors: Frank Scheper, Loeningen (DE); Jens Eismann, Melle (DE); Friedhelm Langhorst, Diepholz (DE); Soren Knopp, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/409,019

(22) PCT Filed: Jun. 6, 2013

(86) PCT No.: PCT/EP2013/061651
§ 371 (c)(1),
(2) Date: Dec. 18, 2014

(87) PCT Pub. No.: WO2014/005786
PCT Pub. Date: Jan. 9, 2014

(65) Prior Publication Data
US 2015/0175206 A1   Jun. 25, 2015

(30) Foreign Application Priority Data
Jul. 3, 2012   (DE) .......................... 10 2012 013 148

(51) Int. Cl.
*B62D 21/02* (2006.01)
*B62D 21/11* (2006.01)
(Continued)

(52) U.S. Cl.
CPC ...... *B62D 21/02* (2013.01); *B60G 7/02* (2013.01); *B60G 9/003* (2013.01); *B60G 11/27* (2013.01); *B60G 11/28* (2013.01); *B62D 21/11* (2013.01); *B62D 27/065* (2013.01); *B60G 2200/31* (2013.01); *B60G 2200/343* (2013.01);
(Continued)

(58) Field of Classification Search
CPC combination set(s) only.
See application file for complete search history.

(56) References Cited

U.S. PATENT DOCUMENTS 2,782,026 A   2/1957   Hirst
3,544,129 A   12/1970   Henry-Biabaud
(Continued)

FOREIGN PATENT DOCUMENTS

DE   1 655 104        2/1972
DE   19525367 A1 *   9/1996   ........... B62D 27/065
(Continued)

OTHER PUBLICATIONS

German Search Report Corresponding to 10 2012 013 148.8 mailed Jan. 4, 2013.
(Continued)

*Primary Examiner* — Nicole Verley
(74) *Attorney, Agent, or Firm* — Davis & Bujold, PLLC; Michael J. Bujold (57) ABSTRACT

A motor vehicle, in particular a utility vehicle (UV), with a vehicle frame and/or a sub-frame (2; 2*a*) that has contact surfaces (10; 10*a*) extending transversely and/or longitudinally relative to the driving direction (F) and are connection surfaces to other structural units (6; 7; 8; 12). The structural units are connected by connecting elements (11) that pass through the contact surfaces (10; 10*a*). The connecting elements each define an axis (13) and are aligned such that the axes of the connecting elements extend through the contact surface (10; 10*a*) at an angle different from 90°.

18 Claims, 6 Drawing Sheets

(51) Int. Cl.
  *B62D 27/06* (2006.01)
  *B60G 7/02* (2006.01)
  *B60G 9/00* (2006.01)
  *B60G 11/27* (2006.01)
  *B60G 11/28* (2006.01)

(52) U.S. Cl.
  CPC ... *B60G2202/152* (2013.01); *B60G 2202/1524* (2013.01); *B60G 2204/126* (2013.01); *B60G 2204/143* (2013.01); *B60G 2204/15* (2013.01); *B60G 2204/4302* (2013.01); *B60G 2204/61* (2013.01); *B60G 2206/601* (2013.01); *B60G 2300/02* (2013.01); *B60G 2300/40* (2013.01)

(56) References Cited

U.S. PATENT DOCUMENTS

| | | | | |
|---|---|---|---|---|
| 3,694,001 A * | 9/1972 | McGee | | B60G 9/003 267/256 |
| 5,088,279 A * | 2/1992 | MacGee | | F02C 7/20 60/226.1 |
| 5,092,649 A * | 3/1992 | Wurl | | B62D 27/065 29/401.1 |
| 5,549,320 A * | 8/1996 | Ellingsen | | B60G 5/04 180/378 |
| 6,213,507 B1 * | 4/2001 | Ramsey | | B60G 7/02 280/683 |
| 6,250,413 B1 * | 6/2001 | Horton | | B62D 21/183 180/291 |
| 6,269,902 B1 | 8/2001 | Miyagawa | | |
| 6,398,236 B1 * | 6/2002 | Richardson | | B60G 11/30 280/124.157 |
| 6,439,588 B1 * | 8/2002 | Svensson | | B60G 5/04 180/352 |
| 6,585,286 B2 * | 7/2003 | Adema | | B60G 5/02 280/124.178 |
| 6,863,289 B2 * | 3/2005 | Buhl | | B60G 7/005 280/124.111 |
| 7,488,023 B2 * | 2/2009 | Kapadia | | B62D 25/082 296/29 |
| 7,766,352 B2 * | 8/2010 | Keeler | | B60G 7/001 280/124.106 |
| 7,793,981 B2 * | 9/2010 | Xie | | B62D 21/02 280/785 |
| 8,333,425 B2 * | 12/2012 | Yoshida | | B62D 21/152 296/187.09 |
| 8,398,138 B2 * | 3/2013 | Mildner | | B62D 27/065 296/187.02 |
| 8,485,555 B2 * | 7/2013 | Hunt | | B62D 21/02 180/311 |
| 8,579,308 B2 * | 11/2013 | Weeks | | B60G 7/02 280/124.109 |
| 8,646,723 B2 * | 2/2014 | Porte | | B64D 29/06 181/214 |
| 9,010,782 B2 * | 4/2015 | Kiselis | | B60G 9/00 280/124.106 |
| 9,150,253 B2 * | 10/2015 | Watanabe | | B62D 21/11 |
| 2008/0007096 A1 | 1/2008 | Fleming | | |

FOREIGN PATENT DOCUMENTS

| | | |
|---|---|---|
| DE | 100 07 790 A1 | 8/2000 |
| DE | 199 49 372 A1 | 4/2001 |
| DE | 10 2009 019 787 A1 | 11/2010 |
| EP | 1 829 767 A2 | 9/2007 |
| EP | 2 246 240 A2 | 11/2010 |
| WO | 2010/074613 A1 | 7/2010 |

OTHER PUBLICATIONS

International Search Report Corresponding to PCT/EP2013/061651 mailed Dec. 12, 2013.
Written Opinion Corresponding to PCT/EP2013/061651 mailed Dec. 12, 2013.

* cited by examiner

MOTOR VEHICLE WITH A VEHICLE FRAME

This application is a National Stage completion of PCT/EP2013/061651 filed Jun. 6, 2013, which claims priority from German patent application serial no. 10 2012 013 148.8 filed Jul. 3, 2012.

FIELD OF THE INVENTION

The invention concerns a motor vehicle, in particular a utility vehicle (UV), having a vehicle frame which comprises contact surfaces, in particular positioned transversely to and/or along the driving direction and forming connection surfaces to further structural units connected by connecting means that pass through the contact surfaces.

BACKGROUND OF THE INVENTION

Most screw-bolts that secure structural units to vehicle frames in the chassis area are loaded by thrust (shear) parallel to the contact surface between the frame portion and the structural unit connected thereto, and therefore transversely to the axis of the bolt. Typically during braking or acceleration large forces are produced in the longitudinal direction of the vehicle, which in the case of longitudinally positioned contact surfaces bolted together act upon the bolts there in a shearing direction, since the bolts pass through the contact surfaces perpendicularly. With such screw joints, at the contact surfaces only around 10% of the screw force applied can be converted into shear force. However, this pre-stressing normal force prevents the components held together along the contact surface from moving relative to one another in a direction in the plane of the contact surfaces. It is therefore important to ensure a sufficiently large normal force. A large number of screws are needed in order to transmit large forces.

But since the friction coefficients at the contact surfaces vary markedly (according to the literature by a factor of three), such connections have to be made oversized in order to reliably prevent loosening and shearing of the joint even when a large force is applied transversely to the axis of the connecting means. This entails higher material costs and additional weight of the components. However, for the desired lightweight designs and because of the need for more compact fitting spaces, screw joints have to be optimized in relation to weight and size.

SUMMARY OF THE INVENTION

The present invention addresses the problem of achieving an improvement in this regard.

The invention solves that problem with a motor vehicle having the characteristics described below. For advantageous design features and further developments of the invention are also described below.

By virtue of the invention, in that at the contact surfaces the axis of each connecting means passes through the contact surface at an angle different from 90°, the result is that the force of the screw connection is divided into a normal and a transverse component. Thus, a shape-interlocking component is produced which allows the pre-stressing proportion to be increased considerably. Consequently, on the one hand, this allows the nominal screw size to be reduced, thus saving material costs and weight. Furthermore, the tightening process for the screw connection can be substantially less precise, so that process costs are reduced and the reliability of the joint is increased. Thanks to the smaller screws the fitting space required is also reduced. Optimally, such screw joints are at least essentially only loaded in tension. Moreover, the demands on surface quality can also be less strict.

To produce as high a pre-stress as possible, it is appropriate for the respective axis of the connecting means to pass through the contact surface concerned at an angle between 30° and 60° relative to a vector lying in the contact surface.

In particular, for an optimum combination between friction force locking and shape interlocking, the respective axis of the connecting means passes through the associated contact surface at an angle of around 45° relative to a vector lying in the contact surface. In that case, for example with a friction coefficient of $\mu=0.1$, compared with a standard screw joint with screws perpendicular to the contact surfaces, the transverse forces to be transmitted are increased by 700% while the longitudinal forces in the screw gap are reduced by 30%.

If when viewed from above the contact surfaces are inclined relative to a longitudinal and a transverse axis of the vehicle, the main force directions between the axis and the vehicle frame, namely transverse and longitudinal movements, also act at an angle to the contact surfaces and therefore assist to a lesser extent the shearing of the components connected there relative to one another, so that the security of the joint is enhanced additionally. A further contribution to this security against the action of forces in the plane of the contact surfaces is provided by corrugating the contact surfaces or adopting similar, friction-promoting measures.

In particular, for each joint arrangement, two axially external contact surfaces are inclined in opposite directions to one another relative to a transverse axis of the vehicle, and can thus contain the joint arrangement between them in the manner of outer walls.

Particularly favorable for high stability are connecting means arranged in a common plane, especially a horizontal plane, in each case in pairs and at an angle to one another.

In that case the connecting means can be arranged symmetrically relative to a perpendicular on the contact surfaces and at an angle of around 90° to one another, so that for oppositely acting forces—for example when accelerating and braking—the support provided is equally good.

With normal screw joints, high loads are present for example where structural units are connected to longitudinal support members and the contact surfaces are therefore directed along the driving direction. Such structural units can for example be in the form of transverse support members connected to longitudinal support members, or of a support with a vertical component connected to a longitudinal member, in particular for holding an axle, a suspension unit or some other chassis component such as an air spring system.

Particularly suitable for saving connecting means and for efficient assembly, fastening means for connecting the structural unit concerned extend through both the structural unit and a longitudinal member and a transverse member, and connect these components simultaneously to one another.

Advantageously, the structural unit connected in each case has a run-in channel for the fastening means and an abutment at an angle to the axis of the channel for a head or a counter-element of a fastening means, so that the correct fitting position of the fastening means is ensured automatically and conical wedges or similar measures for positioning the connecting means obliquely are not needed, To allow passage of the connecting means, the longitudinal members of the vehicle can for example have simple slots. In particular it is appropriate for the abutments to be integrated directly in the structural units.

BRIEF DESCRIPTION OF THE DRAWINGS

Further advantages and features of the invention emerge from the example embodiments of the object of the invention illustrated in the drawing and described below.

The drawing shows.

DETAILED DESCRIPTION OF THE PREFERRED EMBODIMENTS

Figure 1:
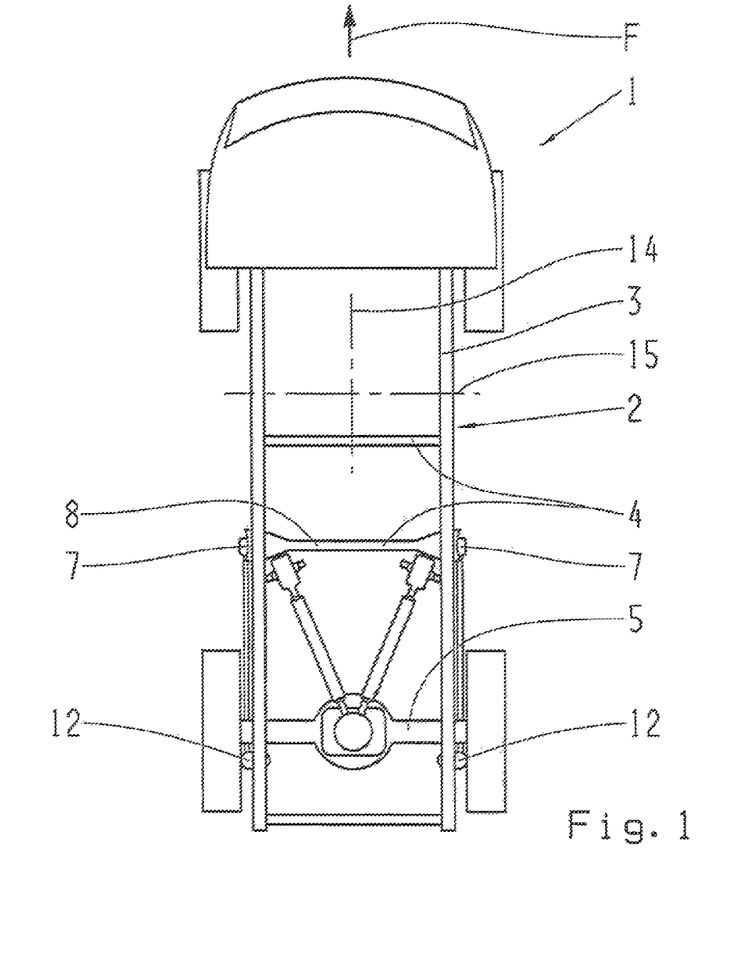
FIG. 1: a schematic plan view of a utility vehicle, as an example with a laterally arranged support for axle components and with a transverse support member held in the area of its connection.
Figure 8:
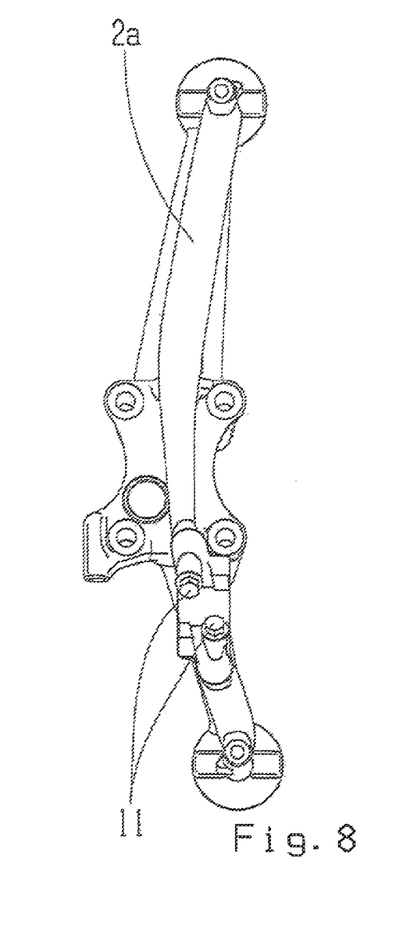
FIG. 8: a side view of an air spring support

The motor vehicle 1 shown schematically in FIG. 1 is in this case a utility vehicle (UV) and comprises a vehicle frame 2 and/or a sub-frame 2a such as the air spring support shown in FIG. 8. Typically, a vehicle frame 2 can comprise two longitudinal support members 3 and a plurality of transverse support members 4, and can be variously designed as a whole. At least one axle 5, for example a rear axle, is coupled to the vehicle frame 2.

Again as examples, a building-site vehicle or an off-road vehicle can be designed in accordance with the invention.

Contact surfaces 10, 10a in particular are positioned transversely to and/or along the driving direction F, the surfaces serving as connecting surfaces on which further structural units can be fixed. For example, longitudinally extending contact surfaces 10 can be formed by the outsides or insides of the longitudinal support members 3, and transverse contact surfaces 10a for example by an extended differential of the axle 5 or by a front or rear side of a transverse support member 4.

Figure 10:
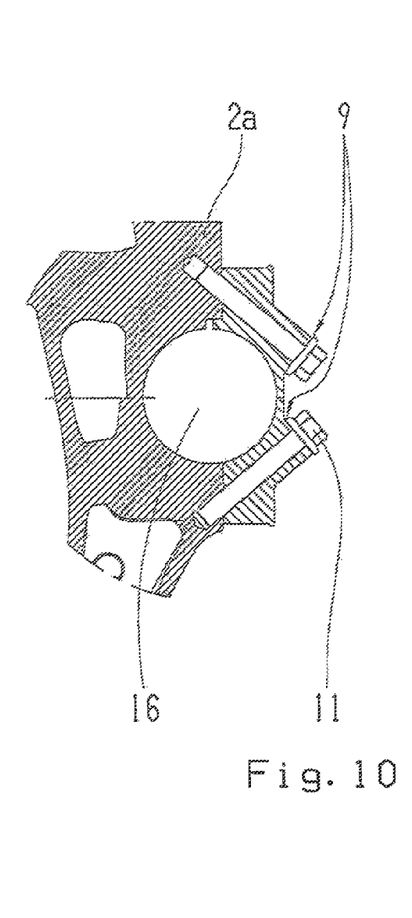
FIG. 10: a sectioned view from above, of the connection of the air spring.

The further structural units are connected to these contact surfaces 10, 10a, and secured on them by connecting means that pass through the contact surfaces 10, 10a, for example countered screw-bolts or the like, in such manner that the axis 13 of a respective connecting means 11 extends through the contact surface 10, 10a through which it passes at an angle α that is different than 90°, in other word obliquely to the surface. Instead of the countered screws, it is also possible to provide blind bores as shown in FIG. 10, in which the screws 11 engage. Riveting or pinning are also possible.

In particular, the respective axis 13 of the connecting means 11 intersects the contact surface 10, 10a through which it passes at an angle α between 30° and 60° relative to a vector lying in the contact surface 10, 10a concerned. Preferably, the respective axis 13 of the connecting means 11 intersects the contact surface 10, 10a through which it passes at an angle α of approximately 45° relative to a vector lying in the contact surface 10, 10a concerned. The connecting means 11 can be arranged in a common plane, in particular a horizontal plane, respectively in pairs and at an angle to one another as shown for example in FIG. 6. The figure shows a pair of fastening means 11 positioned together in a horizontal plane. A plurality of such pairs can be positioned one above another or even next to one another. The angle between the two connecting means 11 is in this case approximately 90° relative to one another, which is not essential but represents an optimum case for a large pre-stress.

Expediently, as also illustrated here, the directions of the fastening means 11 as viewed from above are inclined both relative to a longitudinal axis 14 of the vehicle and to a transverse axis 15 of the vehicle, so that they are not aligned with either of the two main force directions occurring.

Figure 2:
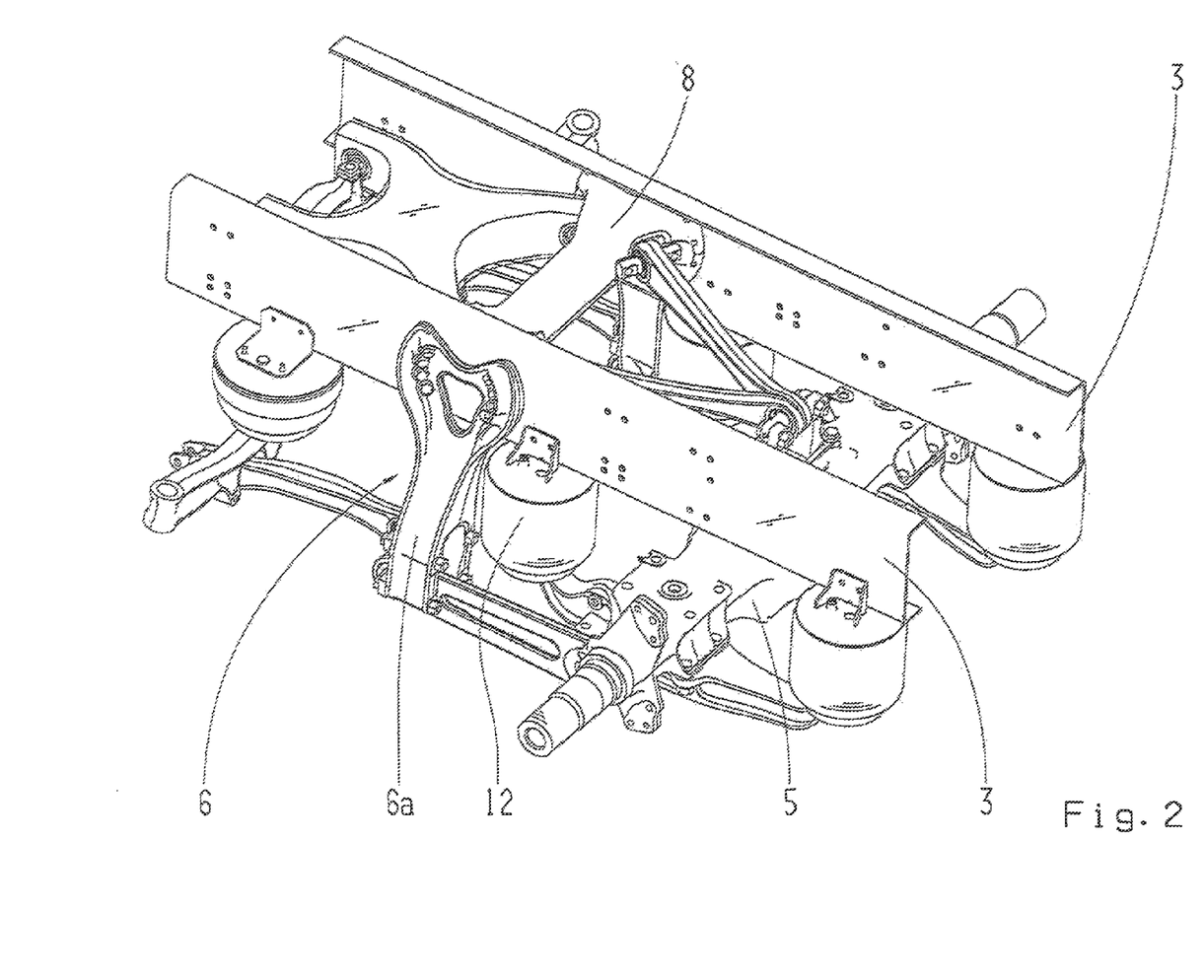
FIG. 2: a detailed perspective view, seen obliquely from above, of two longitudinal member sections connected by a transverse support, wherein, transversely and on the outside, additional supports for chassis components are fixed on the longitudinal members and connected to the transverse member.
Figure 3:
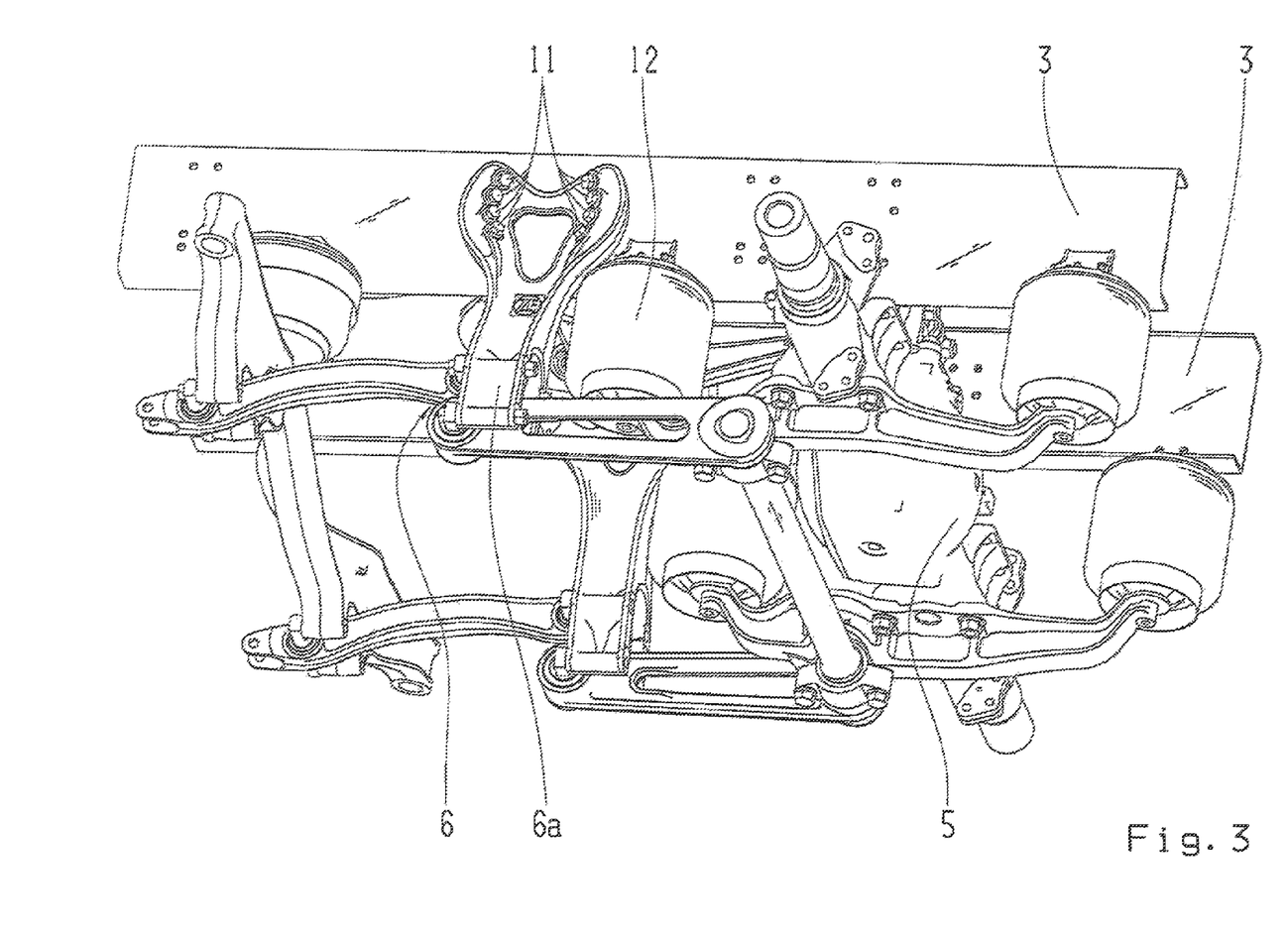
FIG. 3: the arrangement of FIG. 2, in a perspective view seen obliquely from below.
Figure 4:
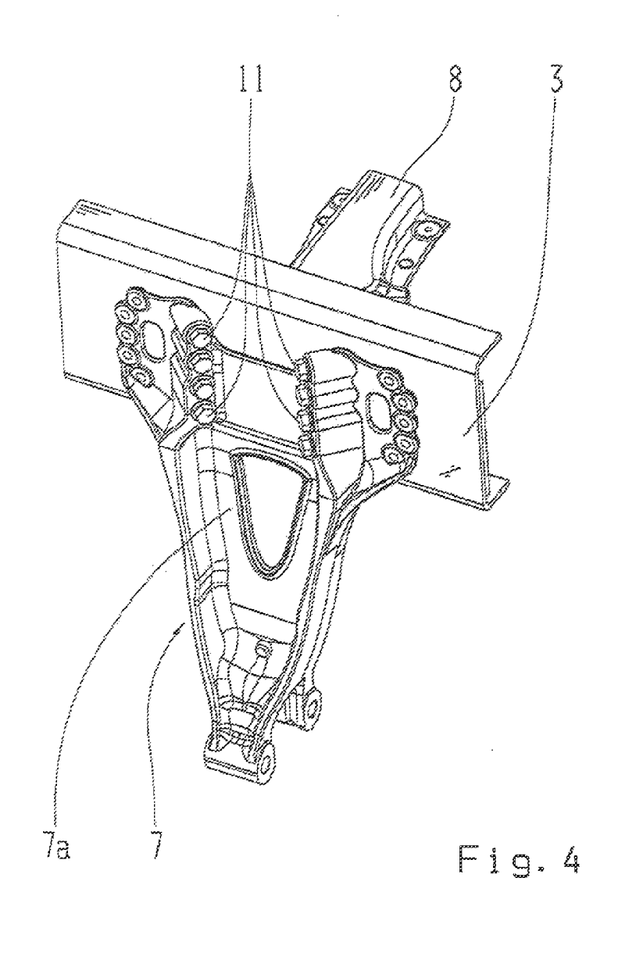
FIG. 4: a detailed perspective view of a connection of a structural unit, seen from a perspective similar to that of FIG. 2, FIG. 5: a side view of the arrangement shown in FIG. 4, FIG. 6: a sectioned view from above, of the arrangement in FIG. 4, FIG. 7: a force-distance diagram of an oblique screw joint and a perpendicular screw joint.
Figure 5:
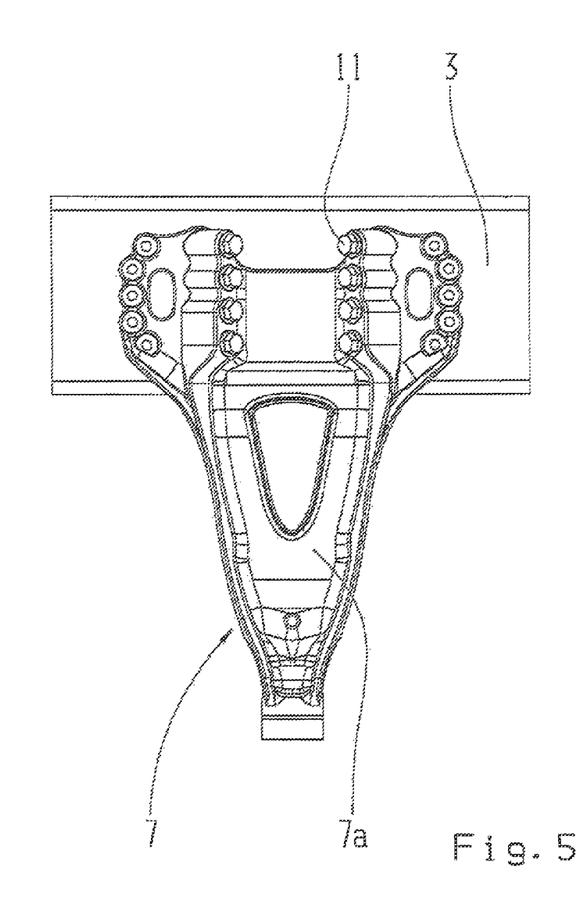
Figure 6:
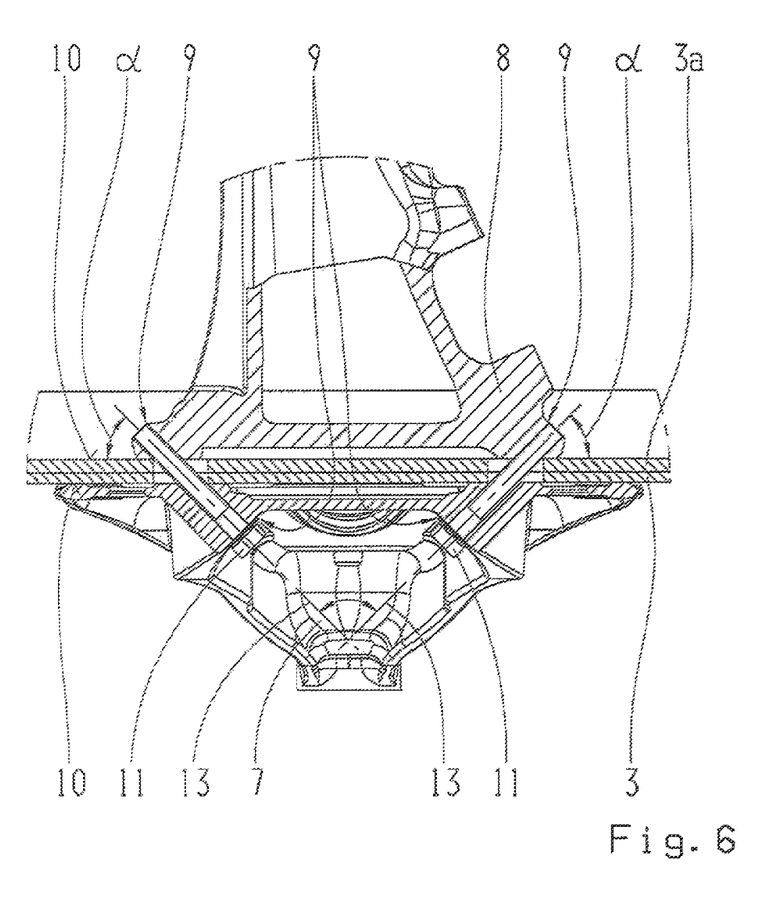

In the example embodiments according to FIGS. 2 and 3 and according to FIGS. 4 to 6, structural units 6 or 7 and 8 are connected to the two side longitudinal support members 3 of the vehicle frame 2. In this case one structural unit 8 is in the form of a transverse support member 4 that connects the two longitudinal members 3 to one another.

The connected structural units 6 or 7 are each in the form of a support 6a or 7a with a vertical component, and serve in particular for holding an axle 5, a suspension unit 11 or some other chassis component 12 such as a holder of an air spring.

Figure 9:
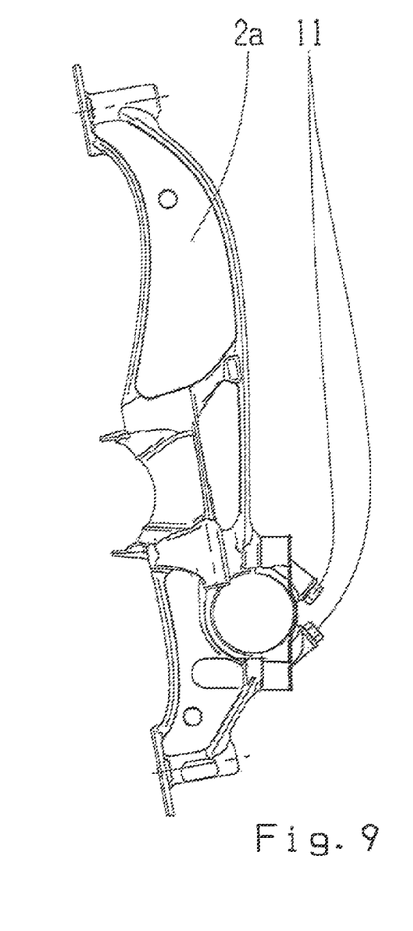
FIG. 9: the support seen from above.

Such an air spring support is in particular also characterized by the sub-frame 2a shown in FIGS. 8 to 10, in which a clamping eye 16, that can be closed by the fastening means 11, is provided for the air spring—itself not illustrated. Thus, connection need not necessarily be made to the vehicle frame 2 but can also relate to a sub-frame 2a associated with the chassis or some other, similar units in the chassis.

In the example embodiments according to FIGS. 2 to 6, fastening means 11 are provided to connect the respective structural units 6 or 7, and pass through both the structural unit 6 or 7 and through a side longitudinal support member 3 as well as a transverse support member 8, and which connect all of these together at the same time. This material-saving and assembly-facilitating design can be seen particularly clearly in the sectioned view shown in FIG. 6. There, the side longitudinal support member 3 is also coupled transversely on the inside with a reinforcing plate 3a so that it is followed by a longitudinally extending first contact surface 10 for the transverse member 8, while on the outside a second longitudinally extending contact surface 10 is available for holding the structural unit 7 (see for example FIG. 4).

In FIG. 6 it can also be seen clearly that the respective connected structural unit 6 or 7 has a run-in channel for a fastening means 11 and an abutment 9 that delimits this axially for a head or counter-element of a fastening means 11. The abutment 9 is here advantageously integrated in the structural unit 7, such that corresponding oblique surfaces are provided on it, which can also be seen clearly in FIGS. 4 and 5. Thus, separate wedges or the like are not needed. In a similar manner, here too the interior transverse support 8 is already provided integrally with such oblique closing surfaces 9 as an abutment for a screw head or a nut.

Figure 7:
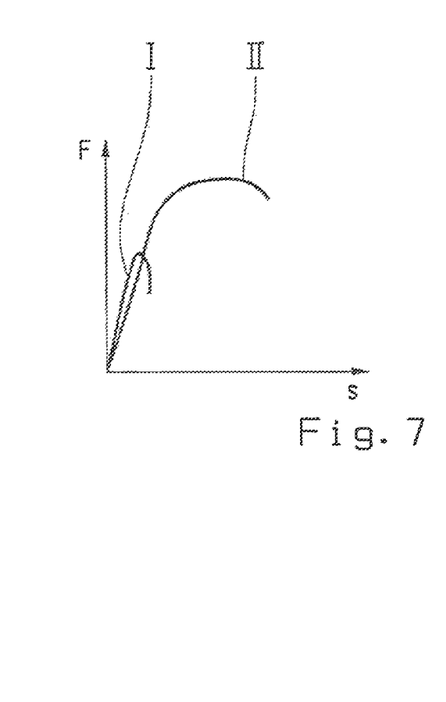

FIG. 7 shows clearly that the screws 11, which due to their oblique positions are only loaded in tension (curve II), transmit much larger forces than ones loaded in the shear direction (curve I). Thanks to the invention, it can be ensured that screws that arranged in pairs opposite and at an angle to one another are always loaded in tension when force is applied along a contact surface 10 or 10a.

A wishbone arrangement (FIG. 1) or a four-point link arrangement (FIGS. 2 and 3) can be connected in this manner, as other components can also be connected to the chassis.

INDEXES

1 Motor vehicle
2 Vehicle frame
2a Sub-frame
3 Longitudinal support member
4 Transverse support member
5 Vehicle axle
6 Structural unit
6a Support with vertical component
7 Structural unit
7a Support with vertical component
8 Transverse support member
9 Abutment
10 Contact surface
10a Contact surface
11 Connecting means
12 Air spring
13 Axis of the connecting means
14 Longitudinal axis
15 Transverse axis
16 Clamping eye

The invention claimed is:

1. A motor vehicle having at least one of a vehicle frame and a sub-frame (2; 2a) that comprises contact surfaces (10; 10a) that extend at least one of transversely and longitudinally relative to a driving direction (F) of the motor vehicle as connection surfaces to other structural units (6; 7; 8; 12),
   the other structural units being connected by connecting means (11) that pass through the contact surfaces (10; 10a), and
   an axis (13) of each of the connecting means (11) extends through the contact surface (10; 10a), through which the connecting means (11) passes, at an angle (α) different from 90°.

2. The motor vehicle (1) according to claim 1, wherein the axis (13) of the connecting means (11) concerned extends through the contact surface (10; 10a), through which the connecting means (11) passes, at an angle (α) of between 30° and 60° relative to a vector lying in the contact surface (10; 10a).

3. The motor vehicle (1) according to claim 2, wherein the axis (13) of the connecting means (11) concerned extends through the contact surface (10; 10a), through which the connecting means (11) passes, at an angle (α) of 45° relative to a vector lying in the contact surface (10; 10a).

4. The motor vehicle (1) according to claim 1, wherein the connecting means (11) are countered screw or bolts.

5. The motor vehicle (1) according to claim 1, wherein, when viewed from above, the connecting means (11) are at an angle to a longitudinal axis (14) and to a transverse axis (15) of the vehicle.

6. The motor vehicle (1) according to claim 1, wherein the connecting means (11) are arranged, respectively, in pairs and at an angle to one another in a common horizontal plane.

7. The motor vehicle (1) according to claim 6, wherein the connecting means (11) are arranged at an angle of around 90° with respect to one another.

8. The motor vehicle according to claim 1, wherein the structural units (6; 7; 8; 12) are connected to longitudinal support members (3).

9. The motor vehicle (1) according to claim 1, wherein a connected structural unit (8) is a transverse support member (4) connected to longitudinal support members (3).

10. The motor vehicle (1) according to claim 1, wherein a connected structural unit (6; 7) comprises a support (6a; 7a) with a vertical component connected to a longitudinal member (3) for holding either an axle (5), a suspension unit (12) or some other chassis component.

11. The motor vehicle (1) according to claim 10, wherein a connected structural unit (2a) either forms or comprises a holder for an air spring (12).

12. The motor vehicle (1) according to claim 1, wherein to connect the structural unit (6; 7) concerned, fastening means (11) pass through both the structural unit (6; 7) and a longitudinal support member (3), and through a transverse member (4), which connects these to one another.

13. The motor vehicle (1) according to claim 1, wherein the respective structural unit (6; 7; 8) concerned comprises a run-in channel for the connecting means (11) and an abutment (9) positioned at an angle perpendicular to an axis of the channel for either a head or a counter-element of the connecting means (11).

14. The motor vehicle (1) according to claim 13, wherein the abutment is integrated in the structural unit (6; 7; 8).

15. A utility vehicle comprising:
   a vehicle frame having longitudinal support members defining a longitudinal axis which extends in a drive direction of the vehicle, and transverse support members defining a transverse axis extending normal to the longitudinal axis, the longitudinal support members comprising contact surfaces extending along the longitudinal axis;
   at least one structural unit having a contact surface and at least two abutment surfaces and channels extending through the structural unit from the contact surface thereof to the at least two abutment surfaces thereof;
   a plurality of fastening means, each of the fastening means defining an axis, the fastening means extending through the channels in the structural unit and being received by the longitudinal support member to fix the structural unit to the longitudinal support member with the contact surfaces of the structural unit and the longitudinal support member abutting one another, a first channel and a first abutment surface of the structural unit being aligned such that the axis of a first fastening means extending therethrough is at an oblique angle with respect to the contact surface of the longitudinal support member, and
   a second channel and a second abutment surface of the structural unit being aligned such that the axis of a second fastening means extending therethrough is at an oblique angle with respect to the contact surface of the longitudinal support member.

16. The utility vehicle according to claim 15, wherein the axis of the first fastening means and the axis of the second fastening means extend at an angle of between 30° and 60° relative to the contact surface of the longitudinal support member.

17. The utility vehicle according to claim 16, wherein the axis of the first fastening means and the axis of the second fastening means extend at an angle of 45° relative to the contact surface of the longitudinal support member.

18. The utility vehicle according to claim 15, wherein the axis of the first fastening means and the axis of the second fastening means extend at an angle of 90° relative to one another.

* * * * *